Jan. 6, 1970     J. F. HAMWI ET AL     3,487,542
CAN OPENER WITH REMOVABLE CUTTER ELEMENTS
Filed Feb. 23, 1968     3 Sheets-Sheet 2
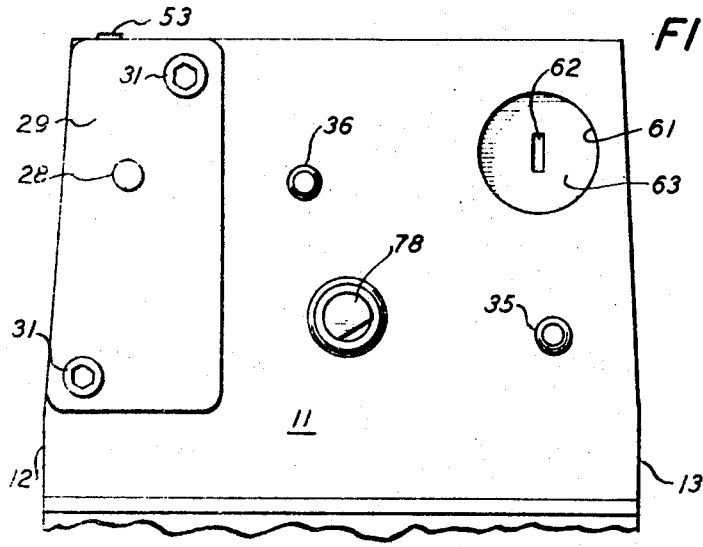
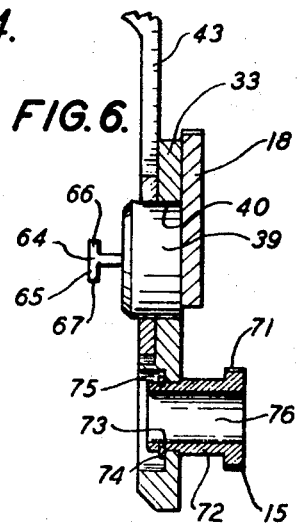
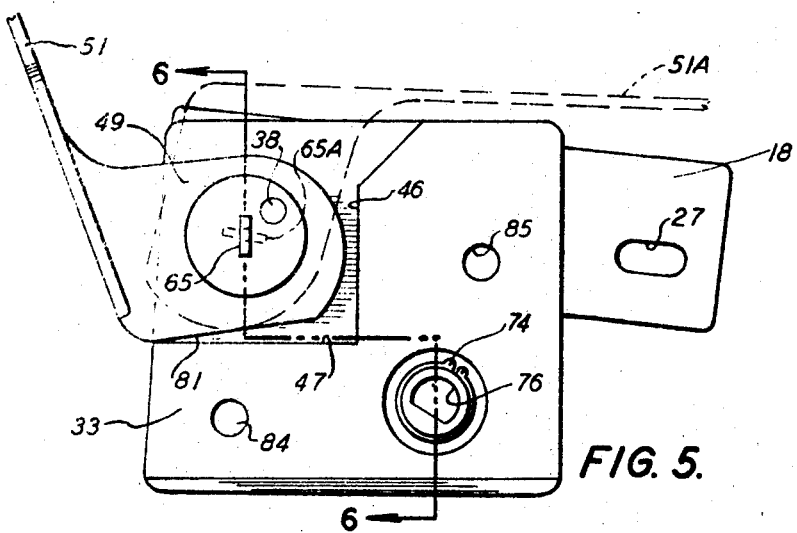
INVENTORS:
JOSEPH F. HAMWI
LOUIS M. BALLARD
BY
W. J. Gribble
ATTORNEY

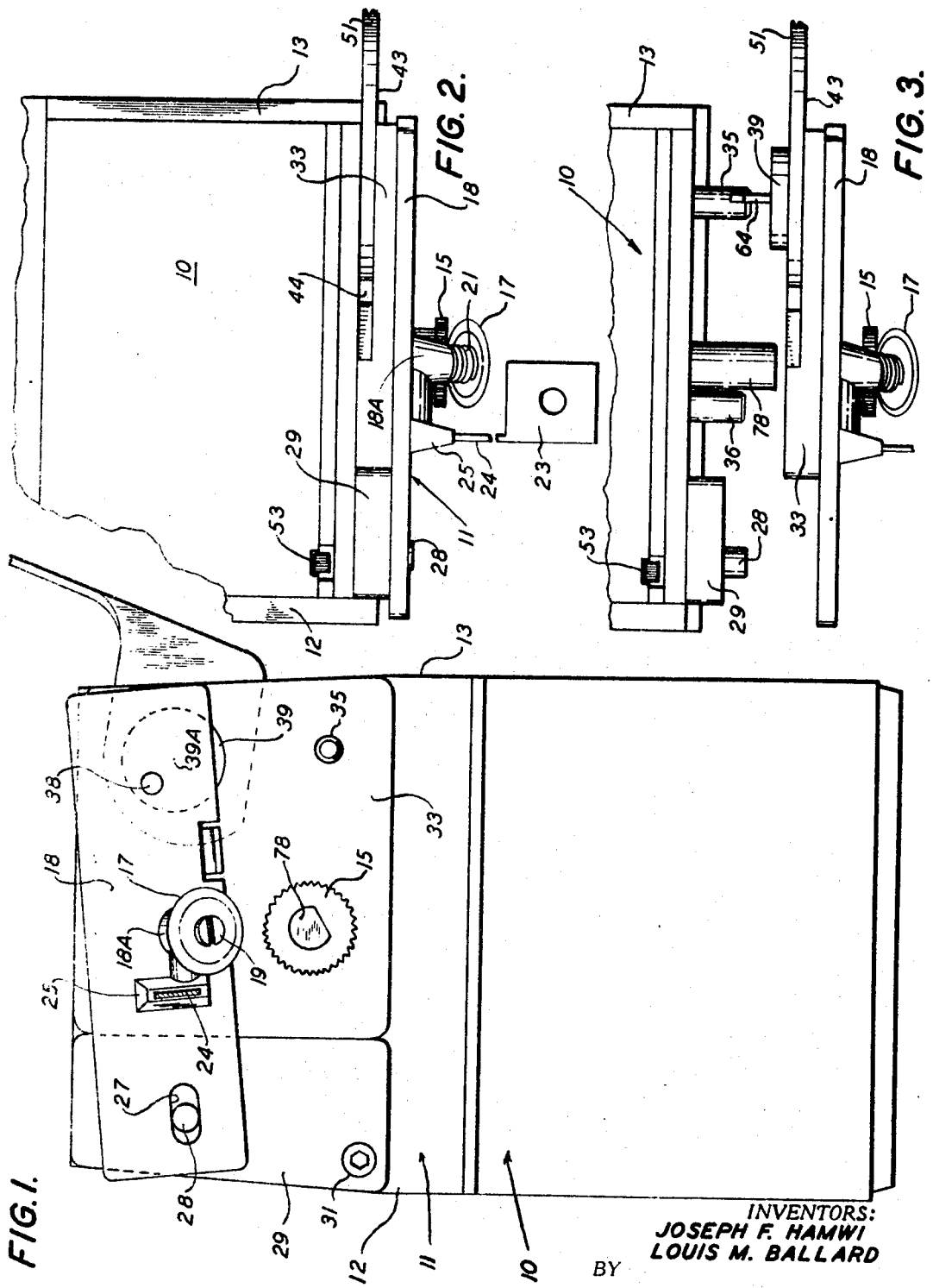

INVENTORS:
JOSEPH F. HAMWI
LOUIS M. BALLARD

BY

W. J. Gribble
ATTORNEY

United States Patent Office 3,487,542
Patented Jan. 6, 1970

1

3,487,542
CAN OPENER WITH REMOVABLE CUTTER ELEMENTS
Joseph F. Hamwi, Los Angeles, and Louis M. Ballard, Arcadia, Calif., assignors to Joseph F. Hamwi, Los Angeles, Calif.
Filed Feb. 23, 1968, Ser. No. 707,822
Int. Cl. B67b 7/38
U.S. Cl. 30—4                                    3 Claims

ABSTRACT OF THE DISCLOSURE

A can rim drive element slidable onto a drive shaft is journaled for rotation in a cutter block or plate. A cutter carrier or plate supports a cutter wheel. The plates are linked together to permit the cutter plate to operate so as to move the cutter wheel toward and away from the rim drive element for piercing the lid of a can having its rim placed against the drive element. The plates are releasably latched to the body of the opener, and an arcuate handle is provided to operate the cutter plate.

BACKGROUND OF THE INVENTION

Field of the invention

This invention relates to electric can openers, and more particularly to means releasably latched to the body of the opener and supporting the cutter wheel and can rim drive element for simultaneous removal from and placement on the body.

Description of the prior art

Various arrangements have heretofore been devised for mounting the cutter wheel on a plate that is releasably held on the body of the opener, e.g., as by manually operable latch means which a housewife can operate to remove the plate and cutter wheel for cleaning. In all such arrangements, the only consideration given to removal of the can rim drive element is to tightly thread it onto the drive shaft. Its removal for cleaning purposes can be accomplished only with special tools and the exertion of considerably effort. Accordingly, the typical mechanically unskilled housewife does not bother to remove the drive element, and limits herself to wiping it off as best she can.

However, it is probably more important to remove and clean the rim drive element. The cutter wheel is a sharp disc from which most food and liquid deposits can be wiped away. The rim drive element, however, is serrated, and its position next to the body of the opener makes it impossible to wipe food and juice deposits from its crevices. The result is a continual buildup and caking on the drive element of deposits which constitute a dangerous source of bacteria.

BRIEF SUMMARY OF THE INVENTION

Our invention embraces an electric can opener wherein the can rim drive element and cutter wheel are carried by respective plates which are linked together and adapted to be releasably attached to and removed from the body of the opener by simple latch means.

The can opener of the invention affords apparatus simple to manufacture, either as a new device or as an attachment for existing openers, and easy to operate without tools to permit complete cleansing of both the cutting elements. These and other advantages of the invention are apparent from the following detailed description and drawings of illustrative embodiments of the invention.

BRIEF DESCRIPTION OF THE DRAWINGS

FIG. 1 is a front elevation of the presently preferred embodiment of the invention;

FIG. 2 is a fragmentary plan view of the assembled opener of FIG. 1;

FIG. 3 is a fragmentary plan view of the opener of FIG. 1 with the cutter elements displaced from the opener body;

FIG. 4 is a fragmentary front elevation of the embodiment of FIG. 1 with the cutter elements removed;

FIG. 5 is a rear or interior view of the cutter block;

FIG. 6 is a fragmentary sectional elevation taken along line 6—6 of FIG. 5;

DESCRIPTION OF ILLUSTRATIVE EMBODIMENTS

Figure 8:
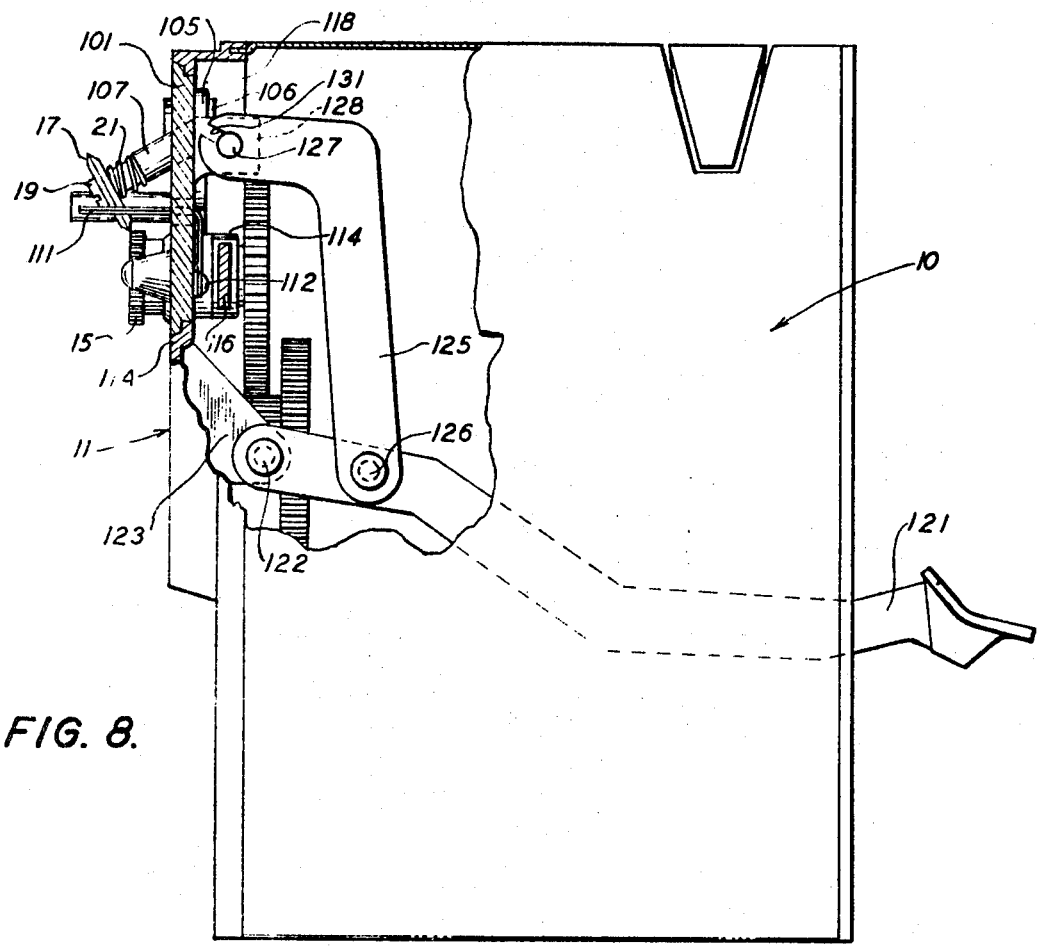
FIG. 8 is a side elevation, partly in section, of the embodiment of FIG. 7.

In the drawing like parts have been given like reference characters.

The can opener of FIGS. 1 through 6 has a hollow body 10, a portion of which is broken away in the figures as unrelated to the invention. The opener has an operative face 11. Sides 12 and 13 enclose the motor and drive mechanism (not shown) which impart rotation to a can rim drive roller 15 in conventional fashion.

The drive roller normally engages the rim of a can (not shown) and rotates the can beneath a cutter wheel 17. The cutter wheel is conventional and is suspended by a cutter carrier or plate 18 to which it is rotatably attached by a post 18A, a screw 19 and a compression spring 21. Cutter carrier 18 also supports a lid magnet 23 by an arm 24 fixed in a carrier boss 25. For clarity the magnet has been removed in FIGS. 1 and 3.

An elongate slot 27 in the carrier receives a pin 28 fixed to the operative face of the can opener body. The pin may be based in a face block 29 secured to the opener body by screws 31. A cutter block or plate 33 is removably secured to the opener body by pins 35, 36 extending horizontally from face 11 of the opener. The cutter block is the same thickness as face block 29 and abuts it. The cutter carrier extends across both the face block and the cutter block. A pin 38, or other suitable similar fastener, is fixed in both the carrier and a pivot drum 39 rotatable within an annulus 40 of the cutter block (see FIG. 6).

An actuating handle 43 fixed to the pivot drum resides in part within a vertical recess 44 defined in the inner face of the cutter block by a vertical wall 46 and a horizontal wall 47. The handle is L-shaped with a bottom portion 49 and a handle stem 51. Normally the actuating handle occupies the position shown by the dotted lines 51A of FIG. 5, wherein downward pressure on the stem causes contact with a switch button 53 in the top of the opener body, turning on the electric motor (not shown) within the body.

The opener is shown with the cutter carrier and handle in the non-operating position. Motion of the handle into the position of dotted lines 51A brings cutter wheel 17 downwardly into close proximity with drive roller 15, such that the lid of a presented can is pierced and the piercing continues around the perimeter of the lid as the can is rotated by drive roller 15. Downward carrier motion is controlled by the position of pin 38 with respect to the pivot point 39A of pivot drum 39. Elongate slot 27 allows horizontal displacement of the cutter carrier to adjust to the arcuate path of pin 38.

The action of the can opener is conventional as thus far described, being representative of an electric can opener made and sold by Udico Company. However, the face and cutter blocks and other apparatus described hereinafter are unique to the invention, providing swift removal of the cutting elements for thorough cleansing.

Pivot drum 39 extends through the cutter block and bottom portion 49 of the handle to reside in a shallow annulus 61 in the operative face of the opener body. A central vertical slot 62 in a back wall 63 of the annulus (FIGS. 4–6) receives a tongue 64 of a latch 65 extending from the pivot drum. In the orientation of the handle illustrated in FIG. 1 and FIG. 5, the tangs 66, 67 of tongue 64 align with slot 62 and permit removal of the tongue from the body such that the handle, cutter block, cutter carrier and, preferably, drive roller 15 may be removed from the opener for cleansing. When handle 43 is in the position of dotted lines 51A of FIG. 5, the tongue assumes the dotted attitude 65A of FIG. 5, opposed to the extent of slot 62 such that the cutter elements are latched to the opener body by tangs 66, 67.

Since it is preferred that the can rim drive roller also be removed for cleaning, the drive roller is journalled in the cutter block as shown in FIG. 6. The drive roller comprises a cog wheel 71 with a hollow shank 72 having a groove 73 adapted to receive a snap ring 74. The snap ring fits that part of the shank within a block cavity 75 in the inner face of the block. An aperture 76 of the shank is D-shaped in cross section as is the extending roller drive shaft 78. The drive shaft is journalled in the body wall of the can opener.

In order to facilitate removal and replacement of the cutter elements, a bottom edge 81 of handle portion 49 is oriented with respect to tongue 64 such that the tongue, when handle edge 81 is in contact with recess wall 47, is vertically oriented to coincide with the attitude of slot 62 in the can opener body. Thus, both in removal and replacement, positive alignment of both tongue and slot may easily be achieved. The cutter carrier removes easily from pin 28 of the face block 29 and it is as easily replaced.

In replacing the cutter elements after they have been cleansed it is only necessary to move the handle to its furthest raised position to align the tongue and body slot, then lift the cutter carrier such that slot 27 and pin 28 coincide and then push cutter block 33 in over pins 35, 36, which fit into pin holes 84, 85, respectively, of the cutter block. The drive roller may be turned within the cutter block to align the flat of its bore with the flat of the drive shaft 78.

The face block and the cutter block may be attached to existing can openers and slot 62 pierced into the back wall of an already existing cavity like cavity 61, to modify an existing can opener to accept the removable cutter elements of the invention. Preferably the face block is made an integral part of the body and the can opener made from its inception embodying the apparatus of the invention.

Figure 7:
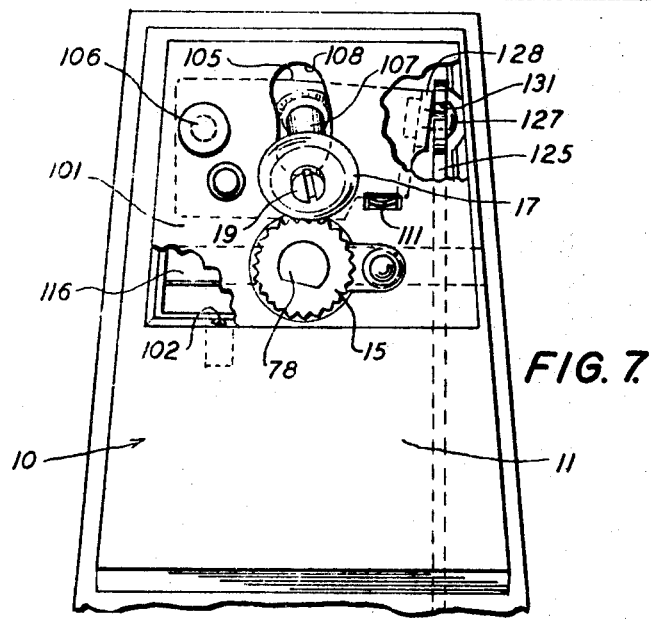
FIG. 7 is a fragmentary elevation, partly in section, of an alternate embodiment of the invention.

The apparatus of the embodiment of FIGS. 7 and 8 illustrates the principles of the invention applied to a different can opener wherein the cutter carrier resides within the body of the opener. Such a can opener is exemplified by General Electric Model No. 107. The hollow body 10 containing the electric mechanism and the drive chain has an operative face 11 with a front thick wall 11A, and a removable cutter block 101 fitted within the thick wall, retained therein by a plurality of ball detents such as the detent 102 of FIG. 7. A cutter carrier 105 resides within the opener body. The carrier is movably secured to the cutter block by a pivot rivet 106. A post 107 extends from the carrier outwardly and downwardly through an arcuate slot 108 in the block to support a cutter wheel 17 secured to the post by a pivot screw 19 and a compression spring 21. A lid restraining leaf spring 111 protrudes from an aperture in the block from an inner mount 112 on the block.

A drive roller 15 is driven by a D-shaped drive shaft 78 journalled in a collar 114 supported by horizontal webs 116. The webs extend from the collar to the inner sides 118 of the front wall member of the body.

An actuating handle 121 extends outwardly of the rear of the can opener from a pivot point 122 secured to a web 123 extending inwardly from the front wall of the opener. An inverted L-shaped link 125 is pivotally secured to the handle at 126 and secured by a rivet 127 to an ear 128 of the cutter carrier. The ear is remote from carrier pivot 106.

In the position shown in the figures, actuating handle 121 has moved the cutter carrier such that cutting wheel 17 is in position to pierce the lid of a can whose rim is driven by drive roller 15. L-shaped link 125 precludes removal of the cutter elements in this position because the notch 131 thereof that straddles the shank of rivet 127 slants upwardly sufficiently to oppose direct horizontal removal of the cutter block. However, when actuating handle 121 is raised upwardly to "off" position, notch 131 becomes substantially horizontal, permitting outward removal of cutter block 101 and cutter carrier 105 from the opener body, and the rivet 127 from engagement with link 125. A spring and guide strips, not shown, may be used to maintain the position of link 125 while the cutter elements are removed from the opening.

Drive roller 15 is journalled in the cutter block as shown and described with respect to the embodiment of FIGS. 1–6.

We claim:
1. In combination:
a can opener body having a drive shaft extending to one face of the body and adapted to be driven by a motor, the end of said shaft being noncircular;
a can rim drive element having a mating noncircular opening to be slidable onto the end of said shaft;
a first support plate,
said drive element being journaled for rotation in said plate;
a cutter wheel;
a second support plate,
said cutter wheel being journaled for rotation in said second plate;
means linking said plates together;
manually operable latch means for releasably holding said plates adjacent said body face with said drive element on said shaft,
said latch means permitting operation of said second plate relative to said first plate to permit said cutter wheel to be brought into piercing contact with the lid of a can whose rim is placed against said drive element;
and an actuating handle engaging said second plate for operating it to move said cutter wheel toward and away from its lid piercing position.
2. The combination of claim 1, wherein said actuating handle is removable with said plates.
3. In a can opener having a case and a drive roller shaft driven by an electric motor with a can rim drive roller on the drive roller shaft and a rotatable can cutter wheel movable by a handle into piercing contact with a can lid presented to the opener, the combination comprising a cutter block, means removably securing the cutter block at the operative face of the can opener, means journaling the can rim drive roller in the cutter block, a cutter wheel carrier mounted to the cutter block for movement with respect thereto, a pivot-mounted actuating handle for the cutter wheel carrier, and latch means removably securing the cutter wheel carrier and the cutter block to the case of the can opener, said latch means comprising a latch tongue extending from the actuating handle pivot, a slotted tongue receiver in the opener case, and tangs on the tongue adapted to grip or release from the receiver in accordance with the position of the actuating handle.

References Cited

UNITED STATES PATENTS

| 2,810,952 | 10/1957 | Sundell | 30—4 |
| 2,979,815 | 4/1961 | Rohde et al. | 30—4 |

FOREIGN PATENTS

| 1,475,656 | 2/1967 | France. |

JAMES L. JONES, Jr., Primary Examiner